United States Patent [19]

Lapeyre

[11] Patent Number: 4,497,551
[45] Date of Patent: Feb. 5, 1985

[54] METHOD AND SYSTEM OF AERIAL SURVEYING

[75] Inventor: James M. Lapeyre, New Orleans, La.

[73] Assignee: The Laitram Corporation, New Orleans, La.

[21] Appl. No.: 498,953

[22] Filed: May 27, 1983

[51] Int. Cl.³ .............................................. G03B 37/00
[52] U.S. Cl. ........................................ 354/67; 354/73; 354/131; 33/1 A
[58] Field of Search ................ 354/67, 131, 354, 105, 354/73; 33/1 A

[56] References Cited

U.S. PATENT DOCUMENTS

| | | | |
|---|---|---|---|
| 2,764,072 | 9/1956 | Walsh | 354/131 |
| 2,909,096 | 10/1959 | Barnett | 354/67 |
| 3,162,103 | 12/1964 | Perkins | 354/354 |
| 3,218,947 | 11/1965 | Domsitz | 354/131 |
| 3,295,426 | 1/1967 | Land et al. | 354/131 |
| 3,307,107 | 2/1967 | Kagan | 354/131 |

Primary Examiner—A. A. Mathews
Attorney, Agent, or Firm—Weingarten, Schurgin, Gagnebin & Hayes

[57] ABSTRACT

A surveying system utilizes remote-controlled flashbulbs of flashlamps which are positioned to identify objects on terrain which is overflown with an aerial camera. The firing of the flashbulbs or flashlamps by a flash actuation signal transmitted either from the aircraft or from the ground is synchronized with the camera operation for providing a photograph of the overflown terrain having highly distinctive markings corresponding to the high intensity light emitted by the flashbulbs or flashlamps.

15 Claims, 2 Drawing Figures

METHOD AND SYSTEM OF AERIAL SURVEYING

FIELD OF INVENTION

This invention relates to surveying, and more particularly to a method and apparatus for providing highly distinctive markings on a photograph of the terrain surveyed.

BACKGROUND OF THE INVENTION

Aerial surveying of terrain has greatly simplified cartography in that the exact position of terrain features may be established through the utilization of the photographs which result from the aerial photography. In the past, predetermined objects on the ground have been premarked, usually through the utilization of paint such that these objects may be accurately located. However, the ready visibility of painted marks may be obscured either by their small size or by terrain features, with the marks not being readily apparent from visual inspection of the resulting photograph.

As illustrated in U.S. Pat. No. 3,162,103, incorporated herein by reference, the position of an object may be ascertained by providing a constant light source at the object whose position is unknown and by providing constant light sources at or adjacent objects at two other known positions. An aerial photograph of the scene depicts the positions of all three objects from which the position of the object of undetermined position may be readily ascertained relative to the position of the other two objects. In this patent, there is no apparatus for providing a single flash of light. Moreover, there is no synchronization between light source actuation and the timing for the aerial camera utilized.

As illustrated in U.S. Pat. Nos. 2,764,072 and 3,218,947, incorporated herein by reference, radio-controlled flash bombs have been utilized with an aerial camera for determining the position of the drop. It will be appreciated that in the systems described in these patents, the flash bomb is detonated well above the ground. Thus, in these patents, there is no prepositioning of the flash producing device relative to the terrain. Prepositioning of markers is important in cartography so that the exact location of the marker, vis-a-vis the rest of the terrain, may be ascertained.

Remotely-controlled flashbulbs or flashlamps have routinely been used to illuminate the scene being photographed. U.S. patents, incorporated herein by reference, relating to remote flashbulb or flashlamp actuation include U.S. Pat. Nos. 3,254,580; 3,295,426; and 3,307,107. It will be appreciated that the flashbulbs or flashlamps in these patents are used to provide background light and the bulbs are not themselves photographed.

The identification of known points on the ground is critical to all types of surveying, giving rise to the desirability of a simple, inexpensive marking system in which a highly visible indication is provided for the photograph taken of the terrain. Prepositioning is required so that appropriate positions on the ground may be accurately located with a view to, for instance, laying out streets, pipelines, electrical transmission lines, or, in the case of agriculture, the proper positioning of rows or furrows which define a field under cultivation. Moreover, location of personnel at sea or on the ground by a simple one-time identification method permits photographic interrogation of personnel location without giving away personnel position.

SUMMARY OF THE INVENTION

In the subject surveying system, remotely-controlled flashbulbs or flashlamps are located at predetermined points on the ground and the area is overflown with an aerial camera. When the aircraft is in position over the area to be photographed, a flash actuation signal is transmitted to the remote-controlled flashbulbs or flashlamps, while at the same time actuating the shutter of the aerial camera. In some cases, simultaneous actuation is not desirable and delays may be built into the synchronizing circuitry to accommodate flashes of differing durations. The result on film is a highly visible point or points of light, the positions of which can be determined through reference to terrain features. If the object is to locate personnel or vessels at sea, remote-controlled flashbulbs or flashlamps are positioned at known locations, with the unknown location of the vessel or person carrying a similar remote control device being determined photographically by an overflying aircraft when the flashbulbs or flashlamps are fired.

While actuation, in one embodiment, is accomplished at the overflying aircraft, actuation signals can be transmitted from the ground or sea when the aircraft is in view and over the terrain. It will be appreciated that because of the short time duration of the flash, detection of personnel or vehicle position by unauthorized persons is made more difficult than utilizing a constant light source. Thus, the subject system is applicable to photographic determination of the deployment of personnel where the position of personnel is to be maintained confidential.

While the subject invention will be described in terms of the utilization of flashbulbs or flashlamps, it will be understood that the one-time light source may include vertically-collimated light beams, laser beams, or even incandescent lamps, light emitting diodes, or fluorescent sources.

As part of this invention, at least one of the remotely-controlled flashbulbs or flashlamps are prepositioned at a known location to provide a reference point on the resulting photograph. Alternatively, if terrain features of known location are readily visible from the air, prepositioning is not required.

BRIEF DESCRIPTION OF THE DRAWINGS

These and other features of the subject invention will be better understood in connection with the detailed description taken in conjunction with the drawings of which.

DETAILED DESCRIPTION

Figure 1:
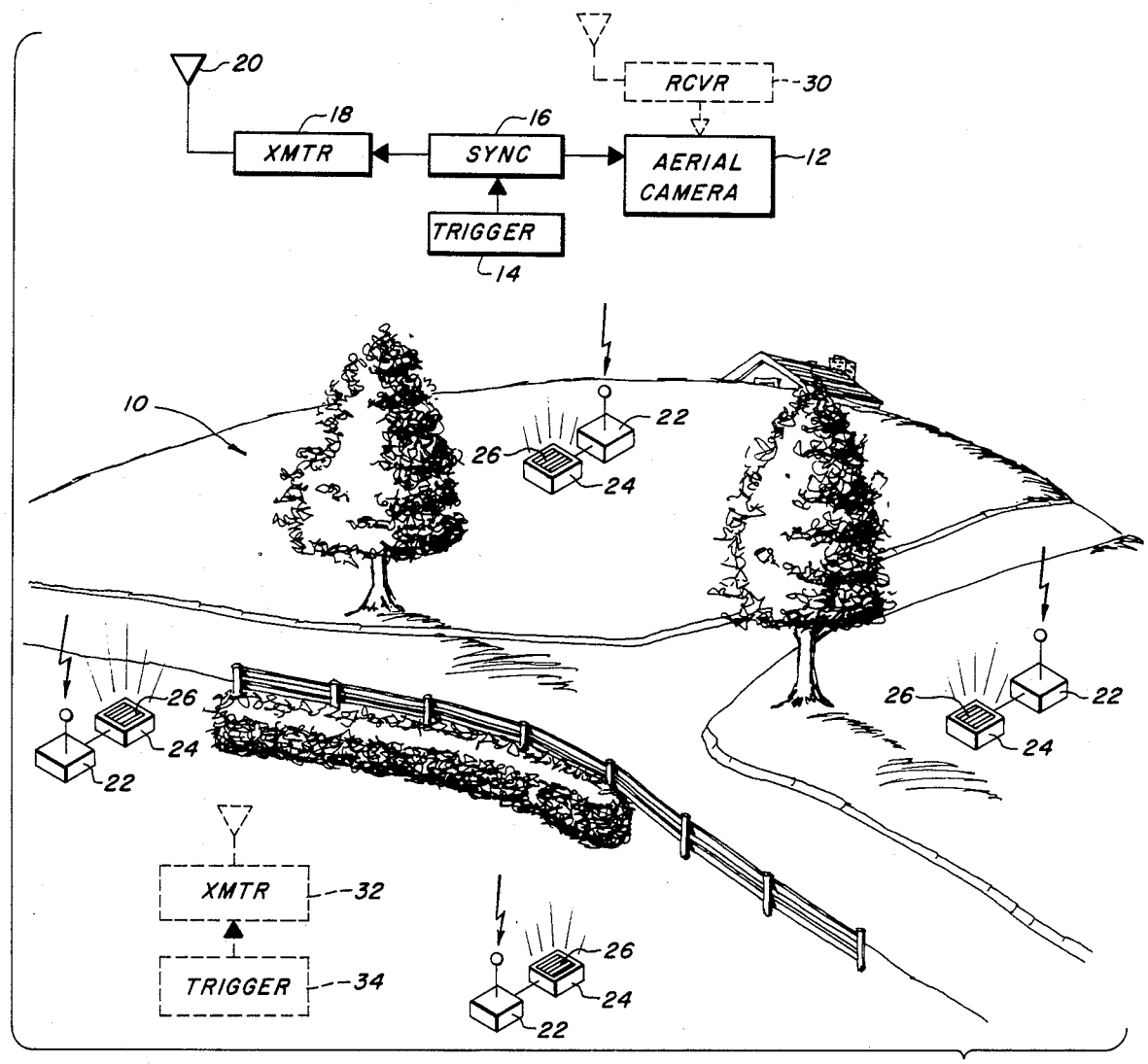
FIG. 1 is a diagrammatic and schematic illustration of an aerial surveillance system utilizing remote-controlled flashbulb or flashlamp markers which are synchronized with the aerial camera.

As illustrated in FIG. 1, a scene 10 may be overflown with an aerial camera 12 which is triggered at 14 through a synchronization unit 16 to photograph terrain 10. Simultaneous with the actuation of the shutter for the aerial camera, a signal is provided from synchronization unit 16 to a transmitter 18 which transmits a signal by antenna 20 to a number of receivers 22, one each associated with a flashbulb or flashlamp firing unit 24 which carries a flashbulb, flashlamp or other light emitting device 26. The flashbulb, flashlamp or light emitting device serves as a remote-controlled marker which is actuated by a person on the aircraft when the particular terrain in question is to be photographed.

Alternatively, trigger 14, synchronization unit 16, and transmitter 18 may be located on the ground and utilized to trigger both the remote-controlled markers and the aerial camera. In this instance, a receiver 30 is provided to receive signals from transmitter 32 activated by trigger 34 for actuating the aerial camera while simultaneously firing the flashbulbs or flashlamps. Remote control of cameras and flash units via RF signals is well known as can be seen from the above-identified patents and is thus not described in detail. Moreover, synchronization involving time delays is described in several of these patents and is not described here.

Figure 2:
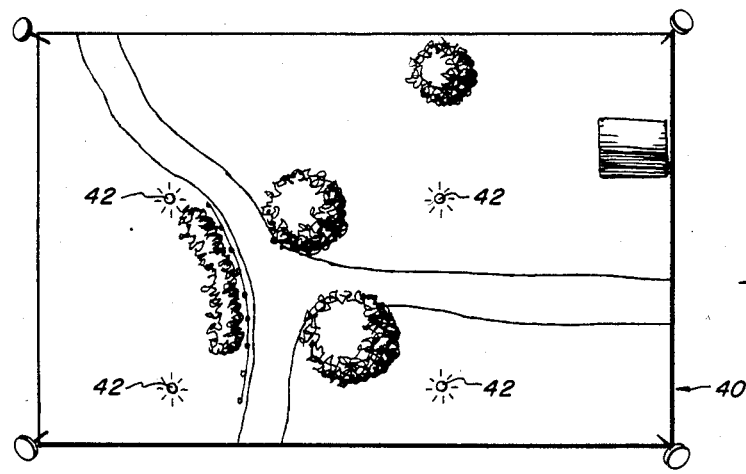
FIG. 2 is a photograph of the scene of FIG. 1 illustrating the highly visible indications provided by the firing of the flashbulbs or flashlamps at the scene in FIG. 1.

The result, as illustrated in FIG. 2, is a positive reproduction of the film such as a photograph 40 depicting the terrain, with the light emitted from the flashbulbs or flashlamps resulting in highly intense points of light 42 on the photograph. Of course the same result can be obtained with an image projected from the film utilized in the aerial camera.

This technique therefore provides an easily implemented system for marking an aerial photograph for features of or objects situated on the terrain which cannot be readily ascertained from the air. While the boundaries of a property may be marked solely by a small monument or marker which is not readily visible from the air, by prepositioning remote-controlled flashbulbs or flashlamps at the boundary monuments, the metes and bounds of the property in question may be accurately portrayed on a photograph with highly visible indications not possible through the use of paint or small dimension markers.

Additionally, the subject surveying system provides a certain amount of secrecy in that the remote-controlled markers are not visible from the air until actuated. The actuation is for a very small period of time such that if not observed at the time of firing, it is difficult to ascertain where the markers are placed.

With respect to rescue at sea, it is oftentimes required that the position of a person or vessel be maintained confidential, yet be able to be established through photographic techniques. The use of the remote-controlled flash marking system permits the position of the individual to remain confidential, but for the momentary flash of light which is provided through the remote-controlled actuation of the flash markers. It will also be appreciated that the light from the flash markers may be collimated so as not to be visible from a lateral direction. This increases the security of the individual so that his position may be ascertained from the air without giving his position away to personnel on the ground.

While high resolution cameras now exist for resolving dimensions as low as one foot from the synchronous satellite orbiting altitude of 22,000 miles, techniques for such resolution require considerable processing, both photographic and electronic. The subject technique provides a readily visible marking on photographic film without complicated processing. While the subject technique is described in terms of photographs, any electronically reproduced facsimile of the scene such as through the utilization of computer generated displays is within the scope of this invention. Thus, the subject system provides a ready marking device for aerial surveillance which not only provides a highly visible indication on the particular display medium utilized, but also results in a certain degree of security since the markers are only actuated for an instant of time.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A method of aerial surveying comprising the steps of:

providing a remotely-controlled light source located adjacent a predetermined object located on the ground subject to survey or a predetermined object located at the surface of the sea subject to survey;

activating the shutter of an aerial camera aimed at the terrain in which said light source is located;

activating said light source to produce a flash of light at the time said shutter is activated; and providing a representation of the scene photographed by the aerial camera, whereby the location of said light source shows up on said representation in the form of a highly visible point of light.

2. The method of claim 1 and further including an additional light source, said additional light source being prepositioned at a known location on the ground subject to survey or at a known location on the sea surface subject to survey.

3. The method of claim 1 wherein both activating steps are accomplished at the aerial camera location.

4. The method of claim 1 wherein both activation steps are accomplished at a location remote from either the aerial camera and the light source.

5. The method of claim 1 wherein both activation steps are accomplished from a location adjacent the light source.

6. A system for aerial surveying comprising:

a remotely-controlled light source located adjacent a predetermined object located on the ground subject to surveying or a predetermined object located at the surface of the sea subject to survey;

an aerial camera having a shutter;

means for activating the shutter of said aerial camera when said aerial camera is aimed at the terrain in which said light source is located;

means for activating said light source to produce a flash of light at the time said shutter is activated; and means for providing a representation of the scene photographed by said aerial camera, whereby the location of said light source shows up on said representation in the form of a high visible point of light.

7. The system of claim 6 and further including additional remotely-controlled light sources on the ground subject to survey or at the surface of the sea subject to survey, all of said light sources being activated by said light source activating means, at least one of said light sources being prepositioned at a known location.

8. The system of claim 6 wherein said light source activating means is at the aerial camera location.

9. The system of claim 6 wherein both of said activating means are at a location remote from either said aerial camera or said light source.

10. The system of claim 6 wherein both activating means are at a location adjacent said light source.

11. The system of claim 6 wherein said light source includes a flash bulb.

12. The system of claim 6 wherein said light source includes a flash lamp.

13. The system of claim 6 wherein said light source includes a pyrotechnic device.

14. The system of claim 6 wherein said camera includes the utilization of film and wherein said representation of the scene photographed includes a positive reproduction of the film utilized in the said aerial camera.

15. The system of claim 6 wherein said camera includes the utilization of film and wherein said representation of the scene photographed by the aerial camera includes the image projected from the film utilized in said aerial camera.

* * * * *

UNITED STATES PATENT AND TRADEMARK OFFICE
CERTIFICATE OF CORRECTION

PATENT NO. : 4,497,551
DATED : February 5, 1985
INVENTOR(S) : James M. Lapeyre

It is certified that error appears in the above—identified patent and that said Letters Patent is hereby corrected as shown below:

In the Abstract

Line 2 - "bulbs of" should read --bulbs or--

Column 4, lines 35-36 - "from either the aerial camera and the light source." should read --from either the aerial camera or the light source.-- line 56 - "high visible" should read --highly visible--

Column 5, line 4 - "flash bulb." should read --flashbulb.-- line 6 - "flash lamp." should read --flashlamp.--

Signed and Sealed this

Eighteenth Day of March 1986

[SEAL]

Attest:

DONALD J. QUIGG

Attesting Officer     Commissioner of Patents and Trademarks